United States Patent
Püttmann et al.

(10) Patent No.: US 6,244,783 B1
(45) Date of Patent: Jun. 12, 2001

(54) WIDENING APPARATUS

(75) Inventors: Franz-Josef Püttmann; Gerhard Balve, both of Lennestadt (DE)

(73) Assignee: Tracto-Technik-Paul Schmidt Spezialmaschinen, Lennestadt (DE)

( * ) Notice: Subject to any disclaimer, the term of this patent is extended or adjusted under 35 U.S.C. 154(b) by 0 days.

(21) Appl. No.: 09/294,977

(22) Filed: Apr. 19, 1999

(30) Foreign Application Priority Data

Apr. 22, 1998 (DE) .............................. 198 17 872

(51) Int. Cl.[7] .............................. E02F 5/10; F16L 1/00
(52) U.S. Cl. .................... 405/184; 405/154; 405/156
(58) Field of Search ................... 405/154, 156, 405/184

(56) References Cited

U.S. PATENT DOCUMENTS

| | | | |
|---|---|---|---|
| Re. 35,271 | * 6/1996 | Fisk et al. ........................ | 405/154 |
| 1,210,187 | * 12/1916 | Marquiss ........................ | 405/184 |
| 4,507,019 | * 3/1985 | Thompson ...................... | 405/154 |
| 4,634,313 | * 1/1987 | Robbins .......................... | 405/184 |
| 4,648,746 | * 3/1987 | Abinett ............................ | 405/184 |
| 4,732,222 | * 3/1988 | Schmidt .......................... | 175/22 |
| 4,925,344 | * 5/1990 | Peres et al. ..................... | 405/184 |
| 5,078,546 | * 1/1992 | Fisk et al. ....................... | 405/156 |
| 5,096,000 | * 3/1992 | Hesse ............................... | 175/22 |
| 5,112,158 | * 5/1992 | McConnell ..................... | 405/154 |
| 5,127,481 | * 7/1992 | Hesse .............................. | 175/295 |
| 5,173,009 | * 12/1992 | Moriarty ......................... | 405/154 |
| 5,302,053 | * 4/1994 | Moriarty ......................... | 405/154 |
| 5,482,404 | * 1/1996 | Tenbusch, II ................... | 405/184 |
| 5,494,118 | * 2/1996 | Wood .............................. | 175/22 |
| 5,507,597 | * 4/1996 | McConnell .................... | 405/156 |
| 5,580,188 | * 12/1996 | Nowak ............................ | 405/184 |
| 5,628,585 | * 5/1997 | Parish, II et al. .............. | 405/154 |
| 5,785,458 | * 7/1998 | Handford ........................ | 405/184 |
| 5,876,152 | * 3/1999 | Hesse .............................. | 405/184 |
| 5,980,157 | * 11/1999 | Puttman ......................... | 405/184 |

FOREIGN PATENT DOCUMENTS

| | | | |
|---|---|---|---|
| 3708616 | * 3/1987 | (DE) | ................... E21C/1/12 |
| 3902081 | * 1/1989 | (DE) | ................... F16L/1/02 |
| 195 27 138 | 7/1995 | (DE) | . |
| 0 735 231 | 3/1996 | (EP) | . |
| 794315 | * 9/1997 | (EP) | ................... E21B/19/08 |
| 819203 | * 6/1936 | (FR) | . |

* cited by examiner

Primary Examiner—Thomas B. Will
Assistant Examiner—Alexandra K. Pechhold
(74) Attorney, Agent, or Firm—Merchant & Gould P.C.

(57) ABSTRACT

An apparatus for widening microtunnels and/or for the destruction and replacement of ground-laid pipework and for the laying of new pipework possesses a tool which displaces the earth and/or destroys and/or displaces pipework laid in the earth, having a housing which is provided with an axial linkage seating, for example a housing passage for a linkage and with a linear drive which moves the tool, for example, on the linkage automatically from a launch pit to an arrival pit and simultaneously lays a follow-up pipe or a follow-up cable in the earth.

25 Claims, 6 Drawing Sheets

WIDENING APPARATUS

FIELD OF THE INVENTION

The invention relates to an apparatus and a method for widening microtunnels, for example a pilot tunnel, and/or for the destruction of ground-laid pipework, by means of which simultaneously new pipework or alternatively a cable can be drawn into the widened microtunnel.

DESCRIPTION OF THE PRIOR ART

The laying of lines without the use of trenches has become increasingly important in recent years. In the course of this development, a method has, inter alia, become established whereby, with the aid of a stationary drilling apparatus, a pilot tunnel of relatively small diameter is initially drilled, for example to an arrival pit or a manhole, the drilling head is removed from the drilling linkage in the arrival pit, and the drilling linkage is fitted with a clearance tool of larger diameter which widens and/or removes the earth in the course of a backward movement of the linkage to the drilling apparatus. Such a method is described in German Patent Specification 4,220,430.

Methods and apparatuses are also known, for example from German Patent Specification 3,533,995, wherein an old pipe laid in the earth is destroyed with the aid of a self-propelled pneumatic hammer drill. In such methods, the pipe shards and the earth surrounding the old pipe are simultaneously displaced laterally and a new pipe is drawn in with the aid of the hammer drill. The destruction and replacement of ground-laid pipework can also be carried out with the aid of a stationary drilling apparatus whose linkage is fitted with a bursting head which destroys the old pipe.

Furthermore, it is known from U.S. Pat. No. 5,580,188 to push a linkage through an old line to an arrival pit or to an existing manhole and there fit it with a clearing head which destroys the old line and, simultaneously, widens the earth surrounding the old line and draws a new pipe into the widened microtunnel.

Finally, German Patent Specification 3,826,513 has also disclosed a method of laying supply lines in the earth without the use of trenches, in which a hammer drill is moved forward on an old line lying in the earth and thereby widens the earth.

In the horizontal laying of lines, it is often necessary to work under constricted circumstances, for example from a cellar space or from an existing manhole. This, however, is not possible if the length of the drill is greater than the dimensions of the space available. This problem arises in particular with the renovation of old pipes or drains, because the diameter of a standard manhole is only 1 meter and the diameter of the manhole aperture is only about 80 cm. These dimensions do not generally enable the known drilling apparatuses to be installed at the level of the old line which is to be replaced without digging and excavation work.

Problems also arise, however, if a launch pit and an arrival pit initially have to be excavated, because the volume of the earth to be removed therefrom, and possibly also to be transported away, is determined by the dimensions of the drilling apparatus.

The object of the invention is therefore to provide an apparatus and a method which permit a space-saving widening of a pilot tunnel or the destruction and replacement of an old line and can be used, in particular, in a standard manhole.

SUMMARY OF THE INVENTION

This object is achieved, first, by an apparatus having a tool with a housing, an axial seating for a linkage in the tool housing and a linear drive located in the housing and engaging on the linkage. This linear drive moves the housing with the tool along the linkage, which extends through a pilot tunnel or through an old pipe laid in the earth. When this is done the tool widens the pilot tunnel, or destroys an old line and displaces the line shards, for example into the surrounding earth, and simultaneously or in a further step draws into the widened microtunnel a line connected to the housing, for example pipework, a protective pipe or a cable.

If the linkage is a stationary linkage, then the tool moves continuously or stepwise on that linkage toward an arrival shaft or a target, while the linkage initially remains in the new pipe connected to the housing and is only removed therefrom when the tool, preferably a clearing head, has reached the arrival pit.

The apparatus can, however, also be operated in a manner whereby the clearing head initially moves forward over a certain distance, then the linear drive in the housing pushes the linkage in the direction of advance by preferably the same distance and the clearing head in turn is then moved forward by, preferably, the same distance.

The linear drive may consist of a plurality of feed cylinders, preferably arranged in a circular manner around the linkage or the linkage seating, and moving the housing with the tool by stages, or the housing with the tool and the linkage alternately stepwise, toward the destination point. A ring cylinder or, in a special alternative embodiment, a standard cylinder may likewise be used, the external diameter of which is usually somewhat smaller than the external diameter of the tools. The feed cylinders may be supported in the linkage and then, when their piston rods are extended, move the housing with the tool over the fixed linkage. The introduction of the piston rods, however, takes place with the housing stationary, so that the housing with the tool and the follow-up pipe attached to the housing are moved forward stepwise. If the linkage is not fixed in the direction of advance, however, the possibility exists that the piston rods of the feed cylinders, for example when introduced subsequently to the forward movement of the clearing head, will entrain the linkage and thus move it in the direction of advance by a distance corresponding to the piston stroke. This is associated with the advantage that the linkage with the housing moves stepwise in the direction of advance and the follow-up pipe connected to the housing cannot be damaged or contaminated by the linkage, which is a particular advantage in the case of drinking water lines. A further advantage of a linkage-free new pipe consists in the fact that it can safely be advanced together with a drain camera or similar monitoring and measurement equipment.

Particularly suitable feed cylinders are hydraulic cylinders, with which, unlike pneumatic feed cylinders, there is no danger that the follow-up pipe will be contaminated by the oil mist contained in the waste air. Because of the absence of waste air, hydraulic cylinders are also very advantageous for working in narrow manholes and launch pits; they also generate considerably less noise than pneumatic cylinders.

Particularly suitable as coupling means between the linkage on the one hand and the housing with the tool and/or the piston rods of the feed cylinders on the other are latching fingers or locking pawls, which, in one direction, lie in contact, for example, with the rungs of a ladder-type linkage and so create an abutment for the housing while they slide away in the opposite direction over the rungs. Also suitable as coupling means, however, are clamping jaws, which possess the advantage that they are suitable for any type of linkage; they merely need to be approximately adapted to the contour of the linkage in question.

Locking pawls may also serve to fix the linkage in one direction when the piston rods of the feed cylinders bear thereon in order to move the housing with the tool forward. In the other direction, the linkage can then be moved forward with the use of such a locking pawl.

BRIEF DESCRIPTION OF THE DRAWINGS

The invention is explained in detail below with reference to the examples of embodiment shown in the drawings. In the drawings.

DETAILED DESCRIPTION OF THE PREFERRED EMBODIMENTS

Figure 1:
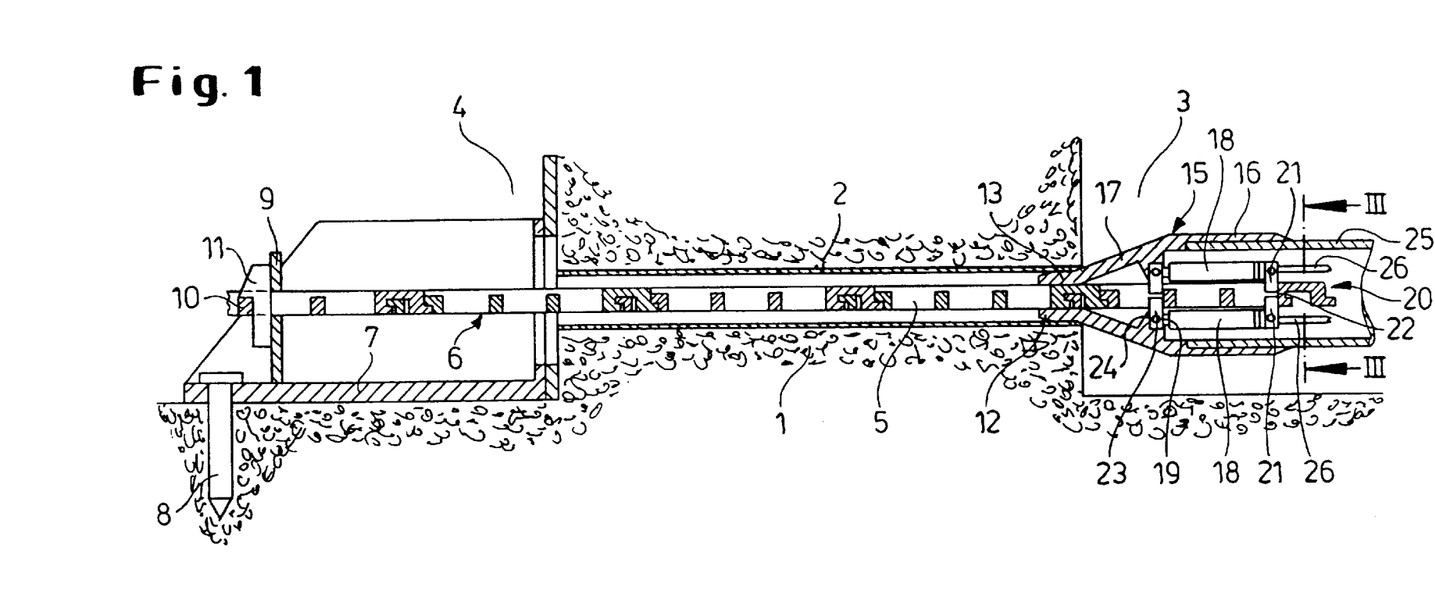
FIG. 1 shows a self-propelled bursting and clearing head with a stationary linkage, in other words a linkage fixed in the longitudinal direction.

An old pipe 2 extends through the earth 1 between a launch pit 3 and an arrival pit 4, for example standard manholes. Located in the old pipe 2 is an inserted linkage 6, consisting of individual sections 5, details of which are described in German Published Application 196 08 980.

Figure 4:
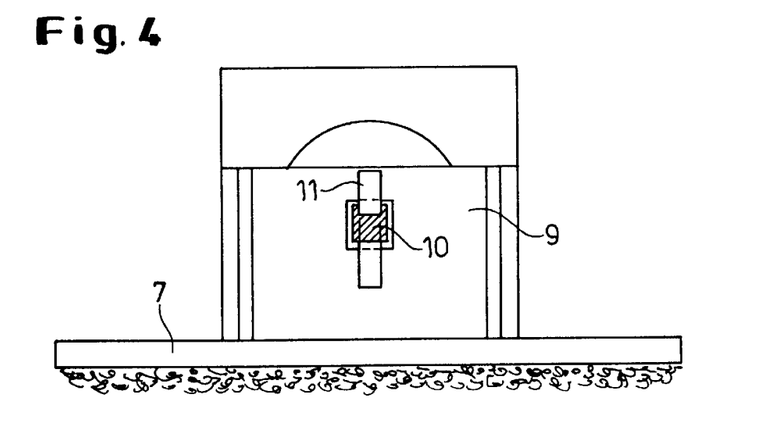
FIG. 4 shows a plan view from the front of the linkage with its locking system in the arrival pit of FIG. 1.

Located in the arrival pit 4 is a frame 7 of L-shaped cross section which is anchored in the earth by means of an earth spike 8. Arranged on the baseplate of the frame 7 is an abutment plate 9, through which the front section 5 of the linkage 6 extends. Between a rung 10 and the abutment plate 9 is an L-shaped locking wedge 11, which prevents movement of the linkage 6 in the direction from the arrival pit 4 to the launch pit 3.

Figure 3:
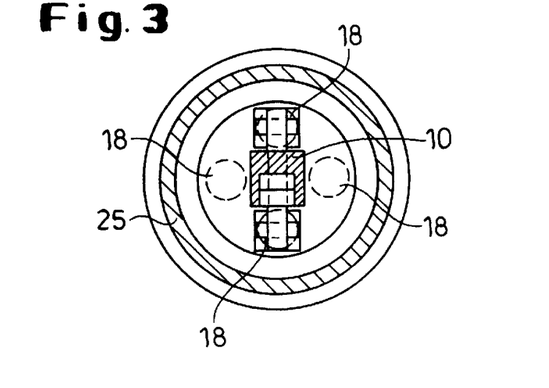
FIG. 3 shows a section along the line III—III in FIGS. 1 and 2.

In the launch pit 3 is a self-propelled bursting and clearing head 15 having a housing 16 whose front end 12 is open and is designed partly as a cylinder 13, partly as a cone 17; it serves as a tool for destroying the old line 2 and for widening the earth 1. The clearing head 15 may be equipped with lubricant and/or flushing medium nozzles. In the interior of the housing 16 a plurality of dual-action hydraulic feed cylinders 18 are arranged in a circular manner around the linkage 6, their piston rods bearing on a collar 19 of the housing. The housing 16, open at the front, forms with the feed cylinders 18 a passage 20 for the linkage 6. The feed cylinders 18 are provided with spring-loaded pivotable locking pawls 21 which, as depicted in FIG. 1, rest on a rung 10 of the linkage 6 on the one hand and on a stop 22 of the piston rod on the other. The upper locking pawl 21 can turn counterclockwise and the lower locking pawl 21 clockwise.

If the locking pawls can be adjusted so that their direction of action is reversed, the bursting and clearing head can also readily be moved counter to the direction of advance.

Locking pawls 23 are likewise mounted in the collar 19, bearing on the one hand on a rung 10 of the linkage 6 and on the other on a housing stop 24. The upper locking pawl 23 can turn away over a rung 10 counterclockwise and the lower locking pawl 21 clockwise.

Connected to the housing 16 is a follow-up pipe 25 through which pressure medium lines 26 are passed to the feed cylinders 18.

The small diameter of the bursting and clearing head permits use at a short distance above the ground, so that no costly digging work is necessary in a standard manhole.

In order to destroy the old pipe 2 with the tool 15, which may consist of two plug-on cones, and at the same time to displace the pipe shards laterally together with the earth surrounding the old pipe, the feed cylinders 18 are subjected to the action of hydraulic oil via the hydraulic oil lines 26, so that their piston rods, supported by the locking pawls 21 on a linkage rung 10, move out. Since the linkage 6 is unable to move in the direction of the launch pit 3 because of the abutment created by the locking wedge 11, when the piston rods extend, the clearing head 15 moves toward the arrival pit 4 by a distance corresponding to the stroke of the piston rods. When this occurs, the locking pawls 23 slide over the linkage rungs 10, located in front of them in the direction of advance, while the locking pawls 21 act as abutment stops and remain in the position shown in FIG. 1 until the piston rods are fully extended. In a second working step, the piston rods are retracted again, the locking pawls 21 now sliding over the linkage rungs 10 located in front of them in the direction of advance, while the locking pawls 23 remain in the position shown in FIG. 1 and, together with the linkage rung 10 adjacent to them, serve as an abutment for the inward movement of the piston rods.

The two working steps described above are repeated in constant alternation until the bursting and clearing head 15 reaches the arrival pit 4 above the baseplate and the front end of the follow-up pipe 25 has arrived in the arrival pit 4. In this position, the clearing head can easily be removed in the free space between the abutment plate 9 and the wall of the pit or shaft.

The length of the linkage sections 5 approximately corresponds to the length of the clearing head 15, so that the launch pit 3 and the arrival pit 4 need not be much larger in the direction of advance because the linkage sections 5 are fed vertically and can be connected to each other via a simple plug-type connection by latching, as is described in detail by German Published Application 196 08 980, which is deemed an integral part of the present description.

Figure 2:
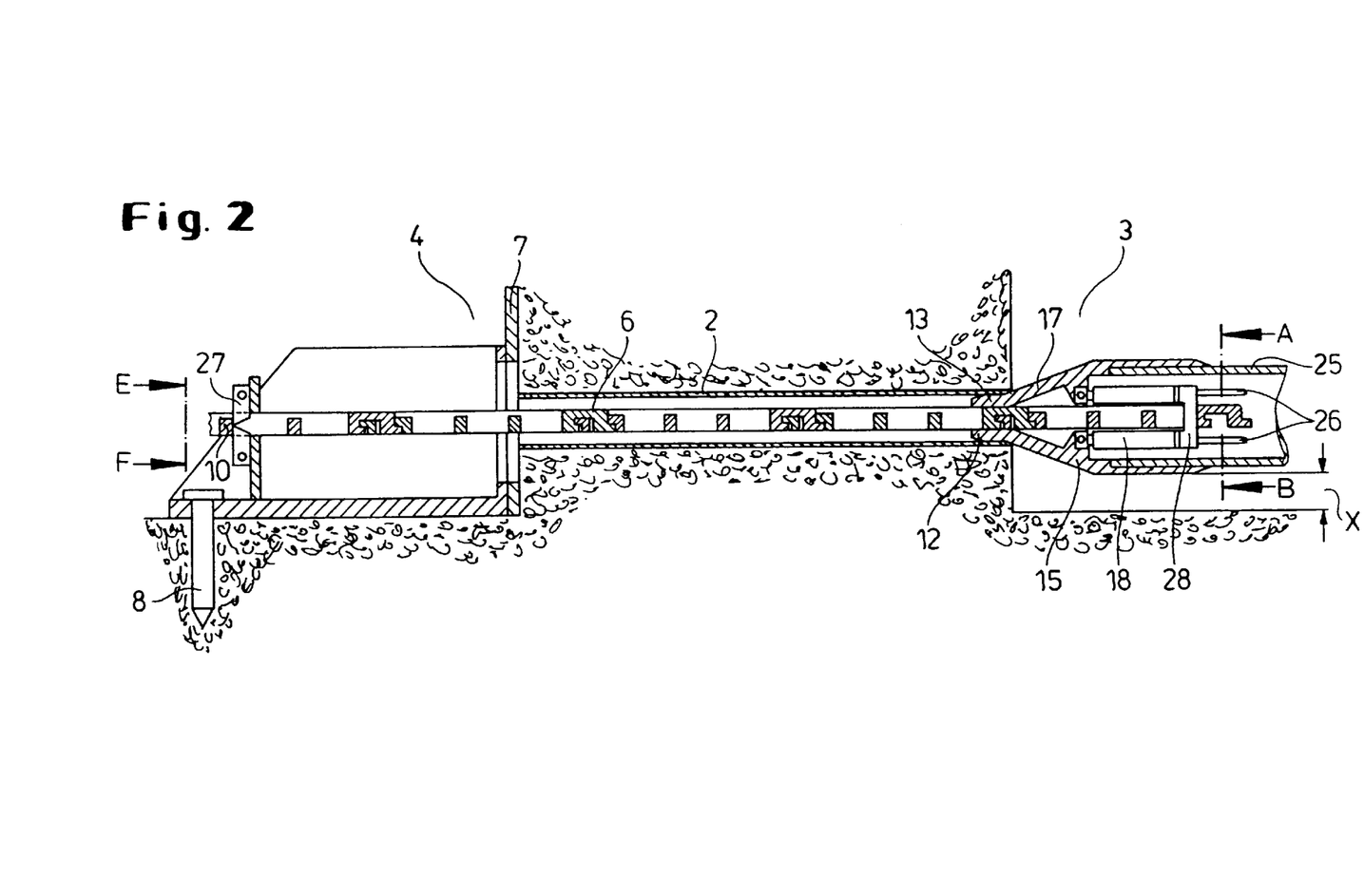
FIG. 2 shows a clearing head with a traveling linkage which is mobile in the direction of advance and fixed in the opposite direction.
Figure 5:
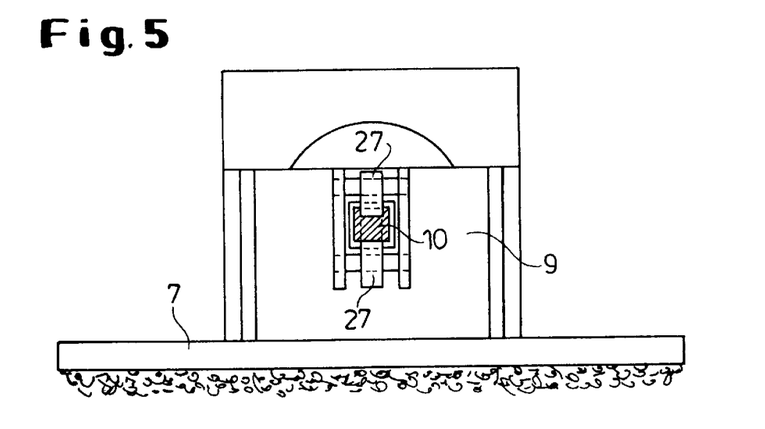
FIG. 5 shows a plan View from the front of the linkage with its locking system in the arrival pit of FIG. 2.

In the example of embodiment according to FIG. 2 a traveling linkage 6 is used which is fixed counter to the direction of advance but able to be displaced stepwise In the direction of advance. To this end, two mutually, opposite locking pawls 27 are arranged on the abutment plate 9, serve in the position shown as a stop for the linkage rung 10 located in front of them in the direction of advance, and slide away over the linkage rungs 10 lying in front of them in the event of a linkage movement in the direction of advance.

In the clearing head 15 according to FIG. 2 the feed cylinders 18 are not provided with locking pawls 27 but are connected via clamping jaws 28, or alternatively permanently, to the linkage 6. Consequently, when the piston rods are extended, the clearing head 15 moves forward on the linkage 6, which is supported on the locking pawls 27 and therefore fixed, toward the arrival pit 4 until the piston rods are fully extended. At the end of this first working step the clearing head 15 is at least partially within the earth, in which it is fixed by wall friction in a manner such that it acts as an abutment when the piston rods entrain the linkage 6 in the direction of advance on retraction, that is to say on each return stroke. This is possible because the linkage rungs 10 in the arrival pit can move through in the direction of advance between the locking pawls 27 until the piston rods are fully retracted and the first working step is repeated.

The interplay described previously between the advance of the clearing head with a fixed linkage 6 and extending piston rods on the one hand and the advance of the linkage with a fixed clearing head 15 during the retraction of the piston rods on the other hand is repeated until the clearing head 15 has arrived in the arrival pit 4.

The self-propelled clearing head according to the invention is suitable not only for the destruction of an old line but also for the widening of a pilot tunnel.

Figure 6:
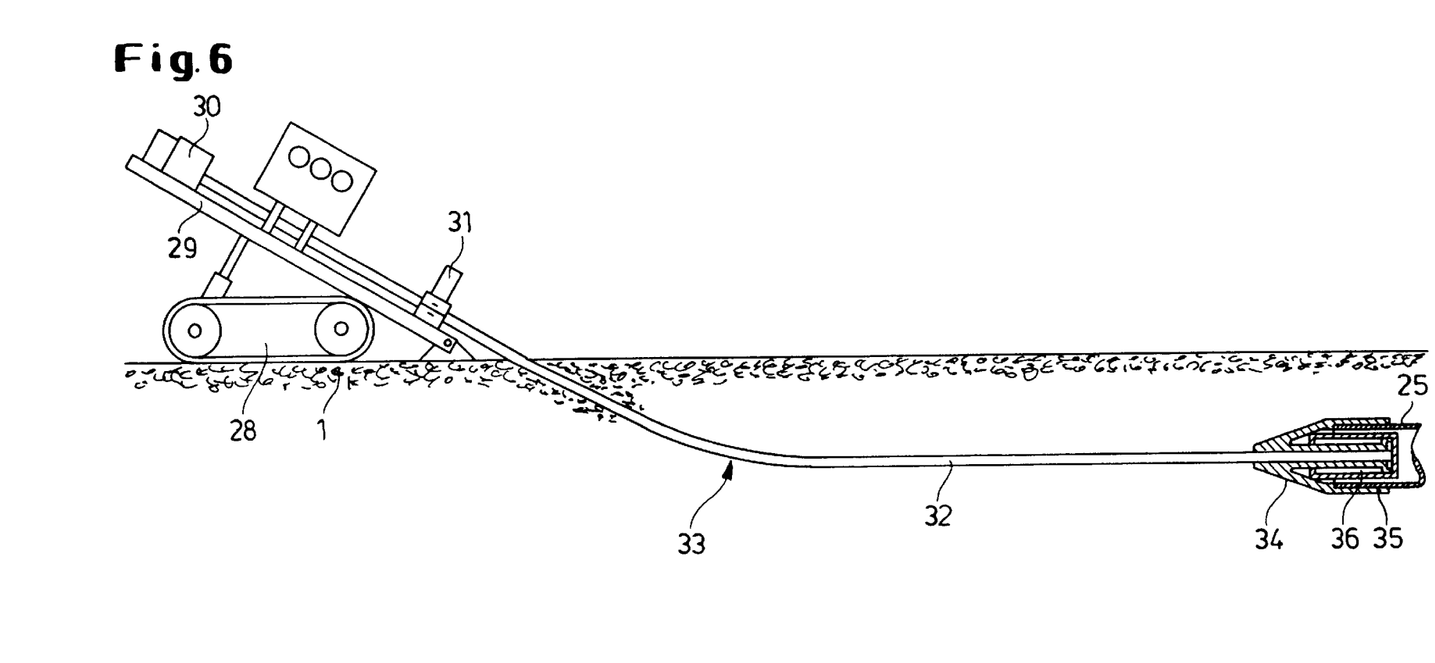
FIG. 6 shows an above-ground platform drilling apparatus with a self-propelled clearing head for widening a pilot tunnel at the end of the drilling linkage.
Figure 7:
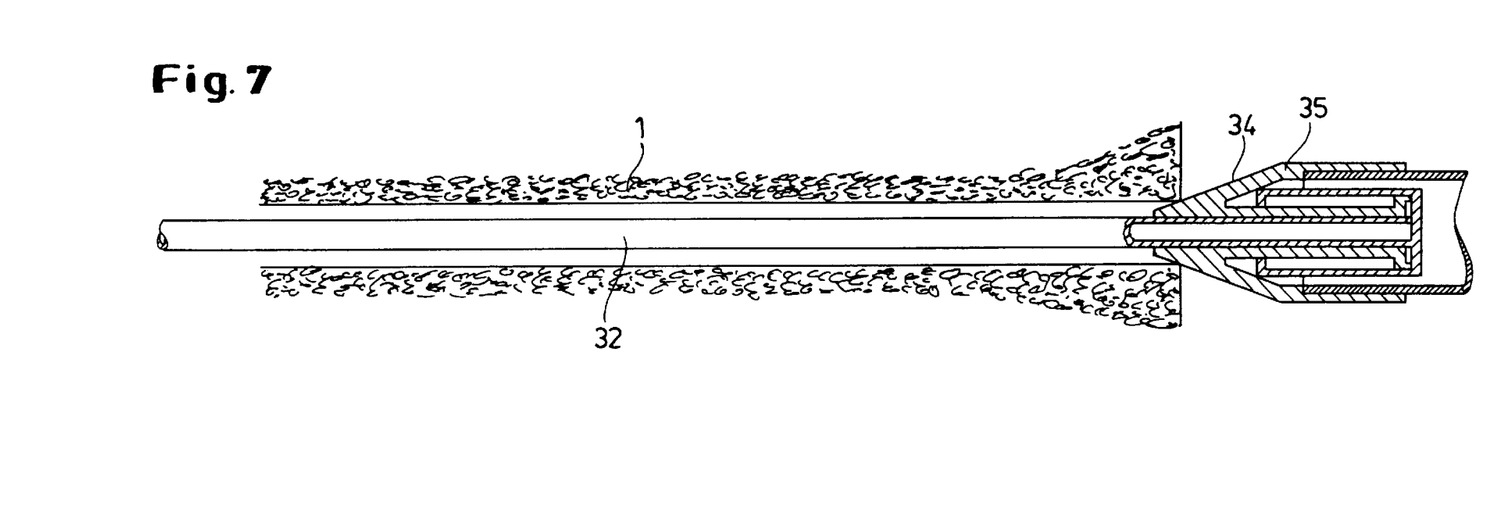
FIG. 7 shows an enlarged illustration of the self-propelled clearing head according to FIG. 6 having a linear drive in the form of a hollow cylinder.

Such a pilot tunnel can be produced with the aid of a drilling apparatus which consists of a tracklaying gear 28 with a platform 29, a traveling push-pull drive 30 and a clamping jaw locking system 31. With the help of a hollow drilling linkage 32 consisting of individual linkage sections a pilot tunnel 33 is made, in a first working step, in the form of an obliquely horizontal drilling from the surface of the ground to an arrival pit (not shown). In the arrival pit, the drilling head is removed from the drilling linkage 32 and replaced by a clearing head 34 (backreamer). The housing 35 of the clearing head 34 is connected to a follow-up pipe 25 and contains a hydraulic cylinder 36 which is guided on the end flange 37 of a hollow piston rod 38 integral with the housing 35. The bottom of the hydraulic cylinder 36 is connected to the hollow linkage 32 in a manner proof against twisting, this hollow linkage 32 having near to the bottom a transverse aperture 39 to a cylinder space 40 located in front of the flange 37 and being guided by the hollow piston rod 38, which thus functions as a linkage seating.

If hydraulic oil from a pressure medium source (not shown) flows through the drilling linkage and thence through the transverse bore 39 into the cylinder space 40, the clearing head 34, 35 moves out of its position according to FIG. 7 into the earth (FIG. 8), when the drilling linkage is axially fixed by the locking system 31. As soon as the clearing head 34 has reached the position according to FIG. 8, the locking system 31 releases the linkage, which is then moved out of the pilot tunnel with the aid of the platform drilling apparatus 28, 29, 30 until the hollow piston has again reached its position according to FIG. 7. Thereafter the clamping jaws of the locking system 31 are again actuated and the hydraulic cylinder 36 is again subjected to the action of hydraulic oil until it is fully extended. This interplay of clearing head advance with fixed drilling linkage 32 on the one hand and drilling linkage reverse movement in the direction of advance or in the direction of the drilling apparatus 28, 29, 30 with the clearing head retained by the earth 1 on the other hand is repeated until the clearing head 34 has arrived at the surface of the ground.

Figure 8:
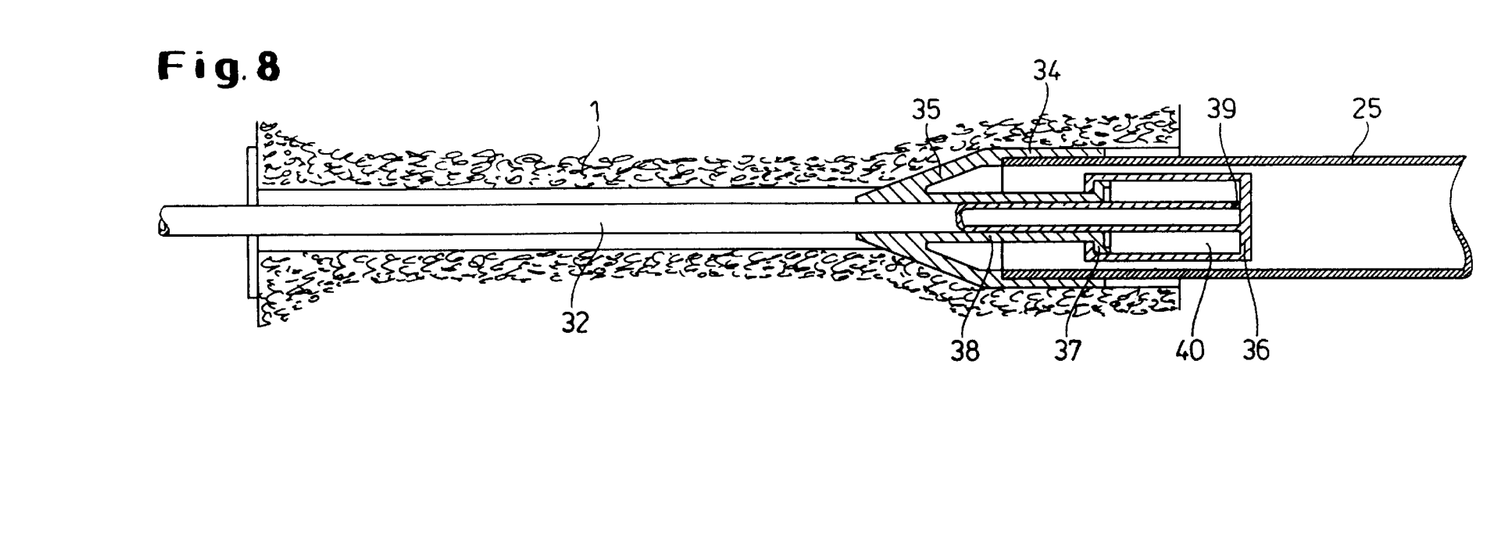
FIG. 8 shows the self-propelled clearing head according to FIG. 7 with the hollow piston rod extended.

In the examples of embodiment according to FIGS. 6 to 8, however, the possibility also exists of retracting the linkage 32 immediately after the extension of the hollow cylinder 36 if the tensile force of the drilling apparatus 28, 29, 30 is not sufficient.

Figure 9:
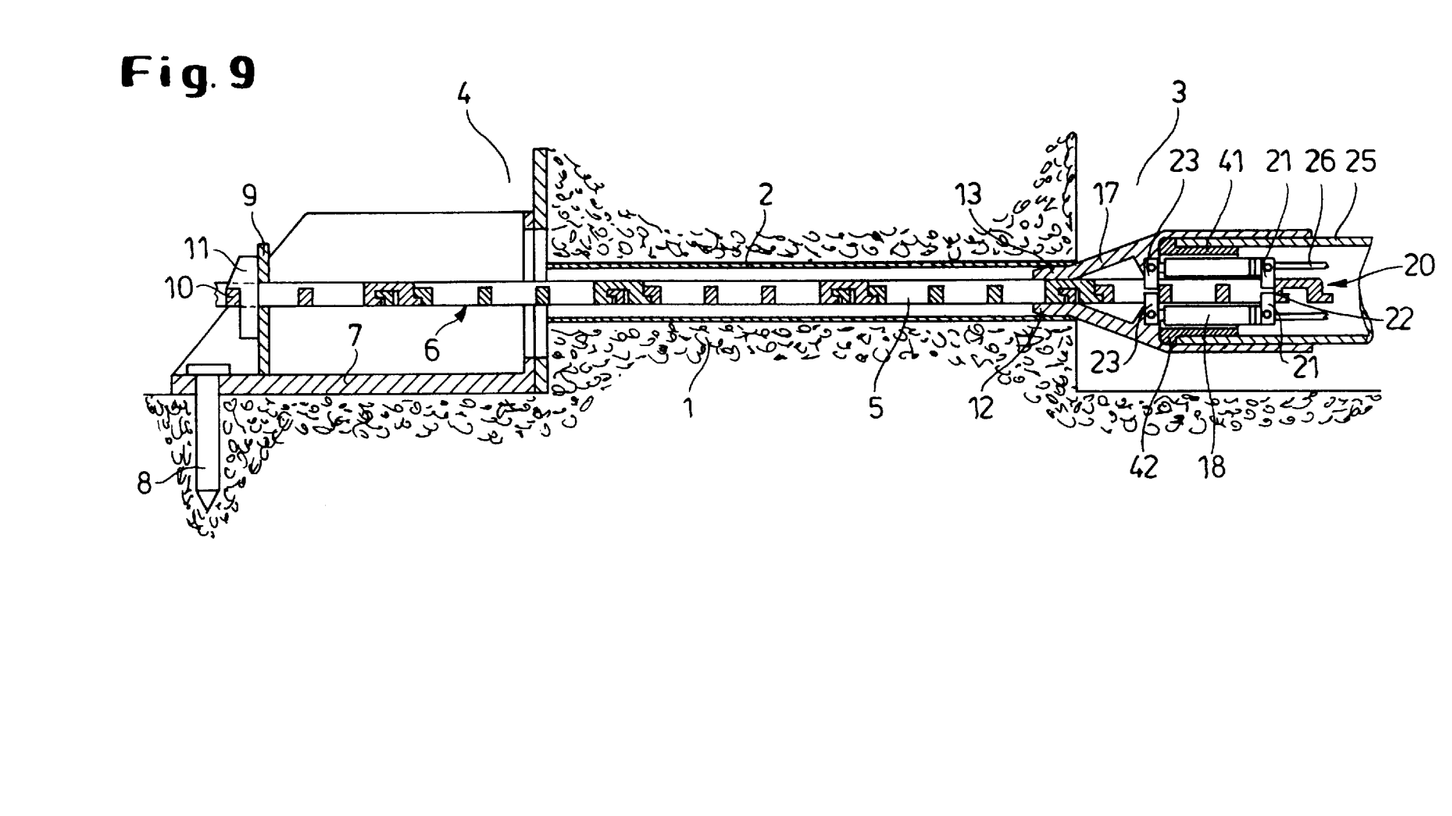
FIG. 9 shows an illustration corresponding to FIG. 1, but with a clearing head of different design.

The clearing head shown in FIG. 9 is constructed, in principle, in the same way as the clearing head 15 according to FIG. 1, but in this case the follow-up pipe 25 is connected not to the equipment housing 16 but to a sliding sleeve 41 arranged in the housing 16. The sliding sleeve 41 possesses a flange 42 on which the end surface of the follow-up pipe 25 bears. The flange 42 is guided in the housing 16 so that, when the piston rods are extended, the clearing head 15 moves over the fixed linkage 6 toward the left into the earth 1, while the feed cylinders 18 with the sliding sleeve 41 and the follow-up pipe do not change their position. After the piston rods have been extended, they return into their initial position, the clearing head 15 not moving but the feed cylinders 18 with the sliding sleeve 41 and the follow-up pipe 25 being drawn into the clearing head housing 16. In this manner, the clearing head 15 and the follow-up pipe 25 are each moved alternately in the direction of advance.

The clearing heads according to the invention need not be operated by means of hydraulic oil. Also suitable for this is a drilling or flushing medium suspension which emerges an the clearing head via nozzles.

What is claimed is:

1. An apparatus for widening microtunnels or for fragmenting ground-laid pipework or for laying new pipework, having a linkage, a tool adapted to be moveable along the linkage, the tool comprising a housing, a hollow piston rod adapted to accept the linkage, the hollow piston rod being disposed within the tool housing, and a linear drive arranged in the tool housing and engaging the linkage, the drive being adapted to move the tool along the linkage.

2. The apparatus as claimed in claim 1, wherein the hollow piston rod defines a passage.

3. The apparatus as claimed in claim 2, wherein a hydraulic cylinder is guided on the piston rod.

4. The apparatus as claimed in claim 3, where the linkage is provided at an end opposite the tool with at least one of the group consisting of a rotary drive and a thrust drive.

5. The apparatus as claimed in claim 3, wherein the bottom of the hydraulic cylinder is connected to a pressure medium linkage, the pressure medium linkage being guided through the passage and having a radial pressure medium aperture.

6. The apparatus as claimed in claim 5, wherein the pressure medium linkage comprises an abutement.

7. The apparatus as claimed in claim 2, wherein the linear drive comprises a hydraulic hollow cylinder unit flush with the passage.

8. The apparatus as claimed in claim 1, wherein the linear drive comprises at least one feed cylinder.

9. The apparatus as claimed in claim 3, wherein the at least one feed cylinder is arranged parallel to an axis of the linkage.

10. The apparatus as claimed in claim 1, wherein the housing is provided with an abutment, and the linear drive is provided with coupling means acting in the direction of the linkage.

11. The apparatus as claimed in claim 10, wherein the coupling means comprises locking pawls.

12. The apparatus as claimed in claim 10, wherein the coupling means comprises clamping jaws.

13. The apparatus as claimed in claim 1, wherein the linkage comprises projections and/or recesses.

14. The apparatus as claimed in claim 13, wherein the linkage is designed as a rack.

15. The apparatus as claimed in claim 13, wherein the linkage is of ladder-type design.

16. The apparatus as claimed in claim 13, wherein the linkage possesses annular or spiral grooves.

17. The apparatus as claimed in claim 1, wherein the linkage comprises an abutment at an end of the linkage.

18. The apparatus as claimed in claim 17, wherein the linkage abutment is provided with a releasable linkage locking system.

19. The apparatus as claimed in claim 1, wherein the housing is provided with apertures for removing earth.

20. The apparatus as claimed in claim 1, comprising a follow-up pipe connected to the housing.

21. The apparatus as claimed in claim 1, comprising a sleeve to which a follow-up pipe is connected, the sleeve being guided in the housing.

22. A method for making or widening microtunnels or for destroying ground-laid pipework or for laying new pipework, the method comprising the steps of pushing a guide linkage forward from a launch point through a pilot bore or pipework to an arrival location, locking the guide linkage in place at an end and moveably connecting a tool comprising a drive to an opposite end of the guide linkage, and moving the tool in steps along the guide linkage with the drive.

23. The method as claimed in claim 22, wherein further comprising the step of subjecting the tool to the action of at least one of the group consisting of a vibration device and an impact device.

24. The method as claimed in claim 22, wherein further comprising the step of rotating the tool.

25. A method for making or widening microtunnels or for destroying ground-laid pipework or for laying new pipework, the method comprising the steps of pushing a guide linkage forward through a pilot bore or pipework to an arrival location, locking the guide linkage in place at an end and moveably connecting a tool comprising a drive to an opposite end of the guide linkage, moving the tool in steps along the guide linkage with the drive, unlocking the guide linkage, and moving the linkage out of the tool in steps with the drive.

* * * * *